United States Patent
Ozcelik et al.

(10) Patent No.: US 6,518,985 B2
(45) Date of Patent: *Feb. 11, 2003

(54) DISPLAY UNIT ARCHITECTURE

(75) Inventors: Taner Ozcelik, Palo Alto, CA (US); Shirish Gadre, San Jose, CA (US); Tomonari Tohara, Foster City, CA (US); Prakash Bare, Fremont, CA (US)

(73) Assignees: Sony Corporation, Tokyo (JP); Sony Electronics, Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/283,376

(22) Filed: Mar. 31, 1999

(65) Prior Publication Data

US 2002/0149626 A1 Oct. 17, 2002

(51) Int. Cl.$^7$ .................................................. G09G 5/00
(52) U.S. Cl. ........................ 345/794; 345/795; 345/790; 345/768; 345/803
(58) Field of Search ................................ 345/158, 152, 345/157, 164, 600, 768, 637, 641, 597, 790, 592, 593, 794, 795, 796, 797, 803, 422, 589; 364/521

(56) References Cited

U.S. PATENT DOCUMENTS

| | | | | |
|---|---|---|---|---|
| 4,653,020 A | * | 3/1987 | Cheselka et al. | 364/900 |
| 4,907,174 A | * | 3/1990 | Priem | 364/521 |
| 5,475,812 A | * | 12/1995 | Corona et al. | 395/158 |
| 5,493,317 A | | 2/1996 | Kim | 345/213 |
| 5,642,498 A | | 6/1997 | Kutner | 395/509 |
| 5,654,738 A | | 8/1997 | Spurlock | 345/132 |
| 5,675,755 A | | 10/1997 | Trueblood | 395/346 |
| 5,703,661 A | | 12/1997 | Wu | 348/673 |
| 5,724,104 A | | 3/1998 | Eom | 348/569 |
| 5,742,285 A | | 4/1998 | Ueda | 345/342 |
| 5,748,174 A | | 5/1998 | Wong et al. | 345/118 |
| 5,838,318 A | * | 11/1998 | Porter et al. | 345/342 |
| 5,999,176 A | * | 12/1999 | Kamper | 345/341 |

* cited by examiner

Primary Examiner—Kristine Kincaid
Assistant Examiner—Mylinh T Tran
(74) Attorney, Agent, or Firm—Wood, Herron & Evans, L.L.P.

(57) ABSTRACT

Display hardware which manages a plurality, e.g. three, potentially overlapping display windows each having its own pixel values and potentially having its own palette, with no limitation as to the position of the windows relative to each other. This capability is provided at a reduced hardware complexity as compared to a parallel hardware approach, by arranging substantial portions of the hardware in a multiplexed fashion so that the same hardware handles the lookup of palette entries for pixel values, regardless of the currently active window. The hardware is arranged so that it may switch in real time from processing data for one window to processing data for another window, whenever the current display coordinate crosses a window boundary.

40 Claims, 4 Drawing Sheets

DISPLAY UNIT ARCHITECTURE

CROSS REFERENCE TO RELATED APPLICATIONS

This application is related to commonly-assigned, copending application ser. No. 09/281,599, filed Mar. 30, 1999, and entitled ON SCREEN DISPLAY, naming Fang-Chuan Wu, which is hereby incorporated by reference herein in its entirety.

FIELD OF THE INVENTION

The present invention relates to display units for producing onscreen displays and the like.

BACKGROUND OF THE INVENTION

Modern video products frequently utilize on-screen displays to provide information and control feedback to the user. Earlier, more primitive on screen displays took the form of text overlying a single-color background, or in some cases text overlying real-time video. More recently, richer on-screen display environments have been generated, having overlapping windows, icons, and a two-dimensionally movable cursor permitting the user to browse through possible options. These richer on-screen display environments are more intuitive to the user and often can supply more information in a more clear fashion than earlier text-based displays.

Unfortunately, there is a penalty associated with producing rich on-screen display environments; specifically, the complexity of the hardware needed to support such displays is substantial. Typically a graphic display is produced by providing to hardware a palette of luminance and/or color values and a bit map of values for each pixel in a region of the display. The values are used to look up luminance and color values for each pixel and display the pixel on the screen. To achieve a reasonable color depth necessary for pleasing icons, the size of the palette may become quite large, and as a result, consume substantial storage space. Furthermore, to display different icons or different graphics in different areas of the display, different palettes may be required.

One approach to designing display hardware, is to provide a predetermined number of parallel display engines, each responsible for producing one of the items displayed on the screen, and thus having its own buffer for storing pixel values, and its own palette. The outputs of these parallel display engines can then be merged together, and if there is an overlap between two items, the conflict may be resolved by a prioritization.

This approach has the advantage of complete flexibility; however, this flexibility comes at a substantial hardware cost, since the display hardware must include multiple complete parallel display engines.

A second approach to designing a display hardware, is to provide a single display engine, reloading this engine with new pixel values and a new palette for each area to be displayed on the screen. This approach has the advantage of simplicity; however, this simplicity comes at a cost of flexibility. Specifically, since the display engine will take a finite time to reload with new pixel values and a new palette, there will be limits to how multiple display windows can be placed on the screen. For example, multiple display windows likely could not lie in the same row since pixels are output on a row-by-row basis in real-time, and the presence of two windows in the same row would require that the display engine generate data for two different windows in real time. Furthermore, there likely will be a minimum number of rows between two display windows, to permit sufficient time for the display engine to re-initialize after displaying a first window and before beginning display of a second window. As a practical matter, these limitations may require that an entire on-screen display be generated in a single window using a single palette, which would make manipulation of the on-screen display more complex as compared to permitting multiple display windows that can be separately manipulated.

Thus, there is a need for a display hardware that has a relatively low hardware complexity yet provides substantial flexibility in defining displays.

SUMMARY OF THE INVENTION

In accordance with principles of the present invention, this need is met by display hardware which manages a plurality, e.g. three, potentially overlapping display windows each having its own pixel values and potentially having its own palette, with no limitation as to the position of the windows relative to each other. This capability is provided at a reduced hardware complexity as compared to a parallel hardware approach, by arranging substantial portions of the hardware in a multiplexed fashion so that, for example, the same hardware handles the lookup of palette entries for pixel values, regardless of the currently active window. The hardware is arranged so that it may switch in real time from processing data for one window to processing data for another window, whenever the current display coordinate crosses a window boundary.

More specifically, in accordance with one aspect, the invention features a display unit for generating a display of a plurality of overlapping windows, with each window having a priority for display and defined by pixels each having a color and luminance value. The display unit has a plurality of buffers, each buffer storing pixel values for one of the overlapping windows. The buffers output pixel value signals for the current display coordinate. An area detector and prioritizer responds to a current display coordinate and determines a highest priority window that has a pixel value for the current display coordinate, and generates an active window signal identifying the highest priority window. A multiplexer receives the pixel value signals from the buffers and, and based on the active window signal, selects one of the buffer output signals for processing. The selected buffer output signal forms the basis for determining color and luminance values for the pixel at the current display coordinate, using common processing circuitry. Thus, while multiple overlapping windows can be managed by the display unit, there is no redundancy in the display unit circuitry other than in the buffers themselves.

In the disclosed particular embodiment, there is a selector circuit that receives the multiplexer output and selects appropriate bits therefrom representing a pixel value at a current display coordinate. The selector is controlled by a position signal. The position signal is generated by a clock/position circuit, based on a number of bits used to represent a pixel in each of the overlapping windows, and signals indicating whether the current display coordinate is inside of each respective windows.

In this embodiment, the clock/position circuit comprises multiple individual window clock/position circuits, one for each window, each comprising a counter which increments each time a current display coordinate is changed, and is enabled only when a current display coordinate is in the window, a multiplexer responsive to the a number of bits used to represent a pixel in the window, which selects a subset of the bits output from the counter to generate a position signal, and a carry detection circuit responsive which generates a consume signal to a buffer when there is a carry into selected bit of the counter. This consume signal causes the buffer to advance to a next word of new pixel value signals, thus consuming pixels in the buffer.

This embodiment uses the pixel value signals produced from the buffers to form addresses into a palette memory, where each location in the palette memory identifies a luminance and/or color value. The palette memory address is formed from the pixel value signal produced by the selector, and an identifier of a palette for the active window. Specifically, an address is generated by combining lower order bits of the selector output signal with upper order bits selected either from the identifier of the palette for the active window, or the higher order bits of the selector output signal, based on the number of bits used to represent a pixel in the active window.

The locations in the palette used in this embodiment also specify a blend value, delivered along with a luminance and/or color value when an address is delivered to the palette. A blend value is used by a blender to blend the luminance and/or color value from the palette memory (reformatted in an appropriate manner to facilitate blending), with a background luminance or color at a ratio responsive to the blend value. To create this blend value, the local blend value obtained from the palette memory is combined with a global blend value for the entire active window, to produce a blend value used by the blender.

In the disclosed embodiment, the area detector and prioritizer generates in window signals respectively indicating whether a current display coordinate is inside of a respective one of said plurality of overlapping windows without regard to priority, by comparing the row and column of the current display coordinate to the row and column limits of the window. These in window signals are used by the clock/position circuit to consume pixel values in the buffers, as described above In this embodiment, the area detector and prioritizer also determines whether the current display coordinate is in a display area of each window, by comparing the row and column of the current display coordinate to the row and column limits of the display area. A window may only be active if the current display coordinate is in the window and in the display area. A priority encoder in the area detector and prioritizer determines which of possibly several potentially active windows has the highest priority, and generates the active window signal by identifying the highest priority active window.

The disclosed embodiment also includes a masking rectangle generator, which can generates a plurality of overlapping masking rectangles, each rectangle having a priority for display, and fixed color and luminance and blend values. In the masking rectangle generator, a rectangle area detector and prioritizer uses the current display coordinate, and row and column limits and priorities of the masking rectangles, to determine a highest priority rectangle at the current display coordinate. Multiplexers the select the color and luminance and blend value for the highest priority rectangle.

To form a complete on-screen display, the rectangle data is blended with background video, and then the window data is blended with the result, to achieve a rich, layered display of on-screen information.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1A:
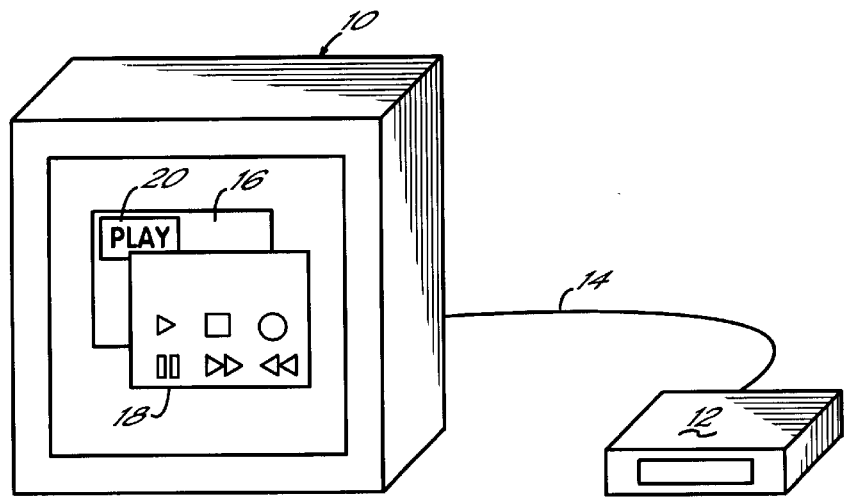
FIG. 1A is an illustration of a video display device connected to a video product having an on-screen display capability, showing an exemplary on-screen display with multiple icons and background rectangles.

Referring now to FIG. 1A, an on-screen display environment such as described above is illustrated. In this environment, a video display 10 such as a television or computer monitor is connected to a digital video product 12 such as a DVD player, high definition television receiver, DSS satellite receiver, digital VCR, or other video product utilizing digital buffering of video for output. Video signals carried on line 14 are reproduced on the screen of display 10, e.g., to allow for the viewing of recorded or off-air programs.

Digital video product 12 utilizes an on-screen display mode to provide information and control feedback to the user. Often this on-screen display information overlies the live video which can be seen around and in some cases through the on-screen display windows. In other cases, a blank background is formed for on-screen display. In the illustrated display environment, two rectangles 16 and 18 have been produced, overlying live video in background. The first rectangle 16 contains one or more windows having menus or icons—in the illustrated situation a box including the text "PLAY" is shown in a window in rectangle 16. The second rectangle 18 similarly contains one or more windows having menus or icons—in the illustrated situation these icons represent various playback functions that may be selected by the user. The user may select a function by controlling a cursor. The cursor may be illustrated on the screen by a changed visual appearance in a selected icon, or in an overlay such as a box surrounding an icon.

Figure 1B:
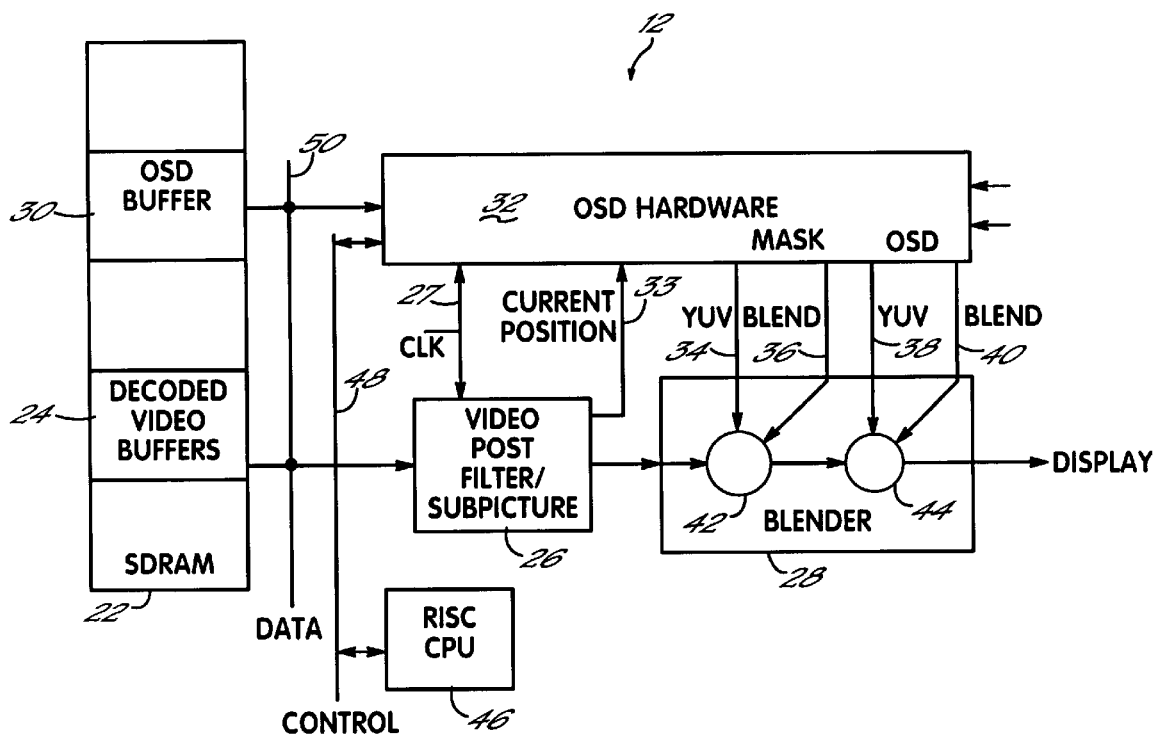
FIG. 1B is an illustration of the architecture of an application specific integrated circuit for producing a video output from decoded digital video and on-screen-display information stored in a digital memory.

Referring now to FIG. 1B, relevant portions of a hardware architecture for a digital video product 12 can be discussed. Typically, such a product will include a digital memory 22 of dynamic read only memory DRAM or synchronized DRAM (SDRAM) for storing digital informnation used in generating video and on-screen displays. Video to be generated by the product 12 may, for example, be stored in one or a number of decoded video buffers 24 within memory 22. Video from decoded video buffers 24 is read by post-filtering and sub-picture hardware 26, and converted to pixels of video to be delivered in synchronization with a pixel clock on line 27, to a blender 28 for blending with on-screen display information.

On-screen display information is generated from descriptive information in an OSD buffer area 30 of memory 22. An OSD hardware section 32 reads OSD information from the OSD buffer area 30 of memory 22, and a current position signal on line 33, and produces in response masking rectangle signals on lines 34 and 36, and OSD window signals on lines 38 and 40. The signals on lines 34 and 38 represent luminance and color information for a mask and an OSD window, if any, that is/are located at a current display coordinate, and the signals on lines 36 and 40 represent blend factors to be used in blending the mask and OSD window luminance and color information with the background video. Specifically, in a first blender 42, video for a current display coordinate generated by post-filter and sub-picture hardware 26, is blended with luminance and color information on line 34 for a masking rectangle, if any, that is located at the current display coordinate, using the blend factor on line 36. In a second blender 44, the output of the first blender 42 is blended with luminance and color information on line 38 for an OSD window, if any, that is located at the current display coordinate, using the blend factor on line 40. The resulting output is delivered to the display 10.

Operations of the various hardware elements depicted in FIG. 1B, and other elements that are not shown such as a digital video decoder, are controlled by a processor such as a RISC CPU 46. CPU 46 is coupled via a control bus 48 to each of the functional units illustrated in FIG. 1B to provide operational control. A data bus 50 also interconnects the functional units to permit flow of data between the respective units.

It will be appreciated from the preceding that masking rectangles are utilized to generate backgrounds for on-screen display windows, to mask out background video. As seen in the following discussion, masking rectangles are characterized by a constant color, luminance and blend factor, and thus are useful primarily in forming backgrounds, such as the rectangles 16 and 18 shown on the display 10 in FIG. 1A. OSD windows provide pixel-level control of luminance, color and blend factors, and thus are useful in forming richly detailed icons or text such as the text 20 appearing in rectangle 16 and the icons that appear in rectangle 18 in FIG. 1A.

Figure 2:
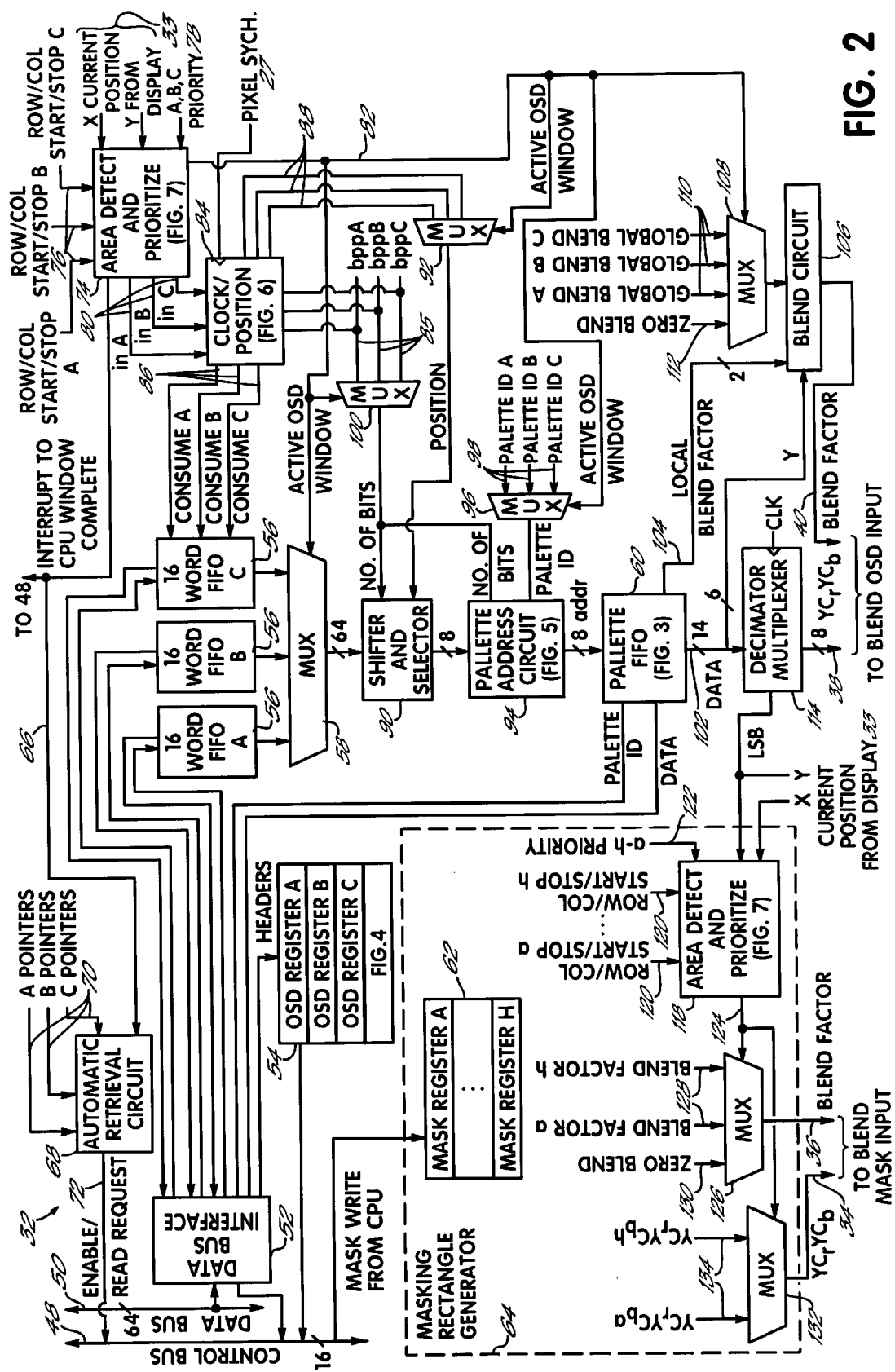
FIG. 2 is an illustration of the architecture of a display unit in accordance with principles of the present invention.

Referring now to FIG. 2, an architecture of the OSD hardware 32 can be explained. A data bus interface 52 interfaces to control bus 48 and data bus 50 to receive OSD information from the memory buffer 30 (FIG. 1B).

Figure 4:
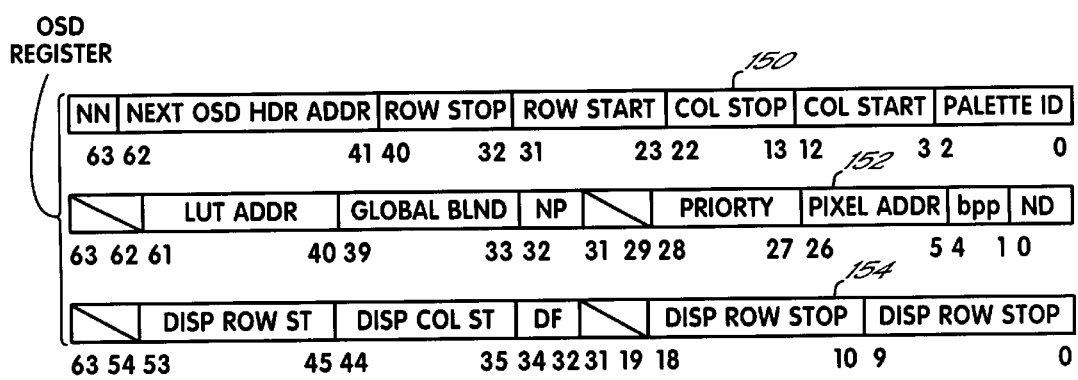
FIG. 4 is an illustration of an OSD header defining an display window generated by the display unit of FIG. 2.

Specifically, OSD information includes a 192-bit OSD header, shown in detail in FIG. 4, which is stored into one of three header registers 54. As will be elaborated below, information in the OSD header is useful for defining the position and content of an OSD window, and accordingly the data in OSD headers stored in registers 54 is obtained and used by many other functional units of the OSD hardware 32, as elaborated below.

OSD information further includes maps of pixel values for an OSD window, which are received through data bus 50 and stored in one of three 16 word FIFO's 56. FIFO's 56 are 64-bits wide and continuously deliver a current 64-bit word of an OSD window on an output connecting to multiplexer 58. FIFO's are self-filling; when there are 8 or less 64-bit words in a FIFO the FIFO automatically delivers a request to data bus interface 52 for additional pixel value data for the same OSD window. Data bus interface 52 responds by determining whether there is additional pixel value data in memory, and if so obtaining the pixel value data and delivering the data to the requesting FIFO.

OSD information further includes palettes, which are delivered through data bus 50 and data bus interface 52 to a palette FIFO 60, the organization of which is described in more detail below with reference to FIG. 3.

OSD information also includes masking rectangle information, which is defined by masking rectangle headers written to registers 62 in a masking rectangle generator 64, and used to produce masking rectangles for the purposes discussed above.

Using the foregoing information, the elements of the OSD hardware shown in FIG. 2 automatically consume and process pixel values in buffers 56 as the current display coordinate passes through each OSD window, determines whether there is an active OSD window for each display coordinate, and if so, determines the palette to be used with the window, and causes the appropriate luminance, color and blending values to be delivered via lines 38 and 40 to the blender 28 (FIG. 1B). At the same time, elements of the masking rectangle generator automatically determine whether a masking rectangle is to be blended into the current display position and causes the appropriate luminance, color and blending values to be delivered vial lines 34 and 36 to blender 28 (FIG. 1B).

It will be appreciated that the architecture illustrated in FIG. 2 is capable of simultaneously processing three OSD windows and eight masking rectangles at a time. This means that up to three OSD windows may be displayed in the same row of the on-screen environment. However, the number of OSD windows is not limited to three. Specifically, an unlimited number of OSD windows may be defined and handled by the hardware shown in FIG. 2, so long as no more than three of these windows lie on the same row of the display.

As elaborated below, when the current display coordinate moves past an OSD window (i.e., reaches the ending row and column address for the window), this fact is noted and an interrupt is provided to the CPU via line 66 (the interrupt may be, for example, delivered to the CPU through control bus 48). In response to this interrupt, the CPU may cause data bus interface 52 to receive new OSD window information for storage in place of the OSD information for the window that has been passed. Through this process, the OSD hardware 32 may be continuously updated with OSD window information for sequential windows as the display coordinate passes throughout the entire display window.

In an alternative operative mode, the OSD hardware may itself automatically retrieve new OSD information when the display coordinate moves past an OSD window currently being managed by the OSD hardware. In this operative mode, an automatic retrieval circuit 68, having been previously activated by the CPU, detects the signal on line 60 indicating that an OSD window has been passed. In response, circuit 68 and utilizes a pointer included in the OSD header of the OSD window that was past (delivered from register 54 on a lines 70 to circuit 68), to determine the memory address of the next OSD window. Then, circuit 68 generates a memory read request, via line 72 connected to control bus 48, to cause delivery of the headers, pixel values and/or palette of a next OSD window to be managed by the OSD hardware. As will be seen below with reference to FIG. 4, the OSD headers include memory address pointers used to arrange the OSD headers into a linked list, each header in the list identifying the memory address of a palette and pixel values to be used in generating the OSD window, as well as the memory address of the next OSD header.

A requirement of the hardware structure illustrated in FIG. 2 is that when OSD windows are provided for display, they must be provided in a sorted order. OSD windows starting at lower numbered rows in the display must be delivered prior to OSD windows starting at higher numbered rows. Furthermore, among OSD windows starting in the same row, windows starting at lower numbered columns in the display must be delivered prior to windows starting at higher numbered columns in the display. A sorting routine for providing OSD windows in a proper order is described in the above-referenced and incorporated patent application of Fang-Chuan Wu.

An integral part of OSD hardware 32 is an area detect and prioritize circuit 74. Circuit 74 receives on lines 76, the start and stop row and column for each OSD window, obtained from OSD headers in registers 54. Circuit 74 also receives the current display coordinate on lines 33, and receives on lines 78, the priority codes for each OSD window, obtained from registers 54. Circuit 74 processes this information to produce (a.) the interrupt signal on line 66 indicating that the current display coordinate has passed out of an OSD window, (b.) signals on lines 80 indicating that the current display coordinate is inside of the A, B or C OSD windows, and (c.) a signal on line 82 identifying the "active" OSD window, if any. Further details on the detect and prioritize circuit 74 are provided below with reference to FIG. 7.

The signals on lines 80 from circuit 74 are delivered to a clock/position circuit 84. Clock/position circuit 84 also receives on lines 85, the number of bits per pixel used in the pixel values of each of the three current OSD windows, obtained from OSD headers in registers 54. Clock/position circuit 84 also receives the pixel synchronization clock on line 27. Circuit 84 utilizes the signals on line 80, which indicate that the current display coordinate is in an OSD window, and the number of bits per pixel used by an OSD window, to track the consumption of pixel values in FIFO buffers 56. More specifically, when 64-bits of pixel values for an OSD window have been consumed by the movements of the display coordinate, circuit 84 generates a signal on a line 86 connected to the FIFO storing pixel values for the OSD window, to cause the FIFO to consume a 64-bit word, and begin delivering the next 64-bit word to multiplexer 58. Clock/position circuit 84 also generates signals on lines 88, each indicating the starting position, in the 64-bit word output by a FIFO 56, of the bits identifying a pixel value corresponding to the current display coordinate. Further details on the clock/position circuit 74 are provided below with reference to FIG. 6.

The active OSD window signal on line 82 from circuit 74 is delivered to the control input of multiplexer 58, causing multiplexer 58 to deliver to its output, the 64-bit word from the FIFO storing pixel values for the currently active OSD window. This 64-bit word is delivered to a shifter and selector circuit 90. The starting position signals on lines 88 are delivered to a multiplexer 92. The control input of multiplexer 92 is connected to the active OSD window signal on line 82, causing multiplexer 58 to deliver to its output, the position signal generated by circuit 84 for the active OSD window identified by circuit 74. This position signal output by multiplexer 92 is delivered to shifter and selector circuit 90.

A multiplexer 100 receives, on lines 85, the number of bits per pixel used in the pixel values of each of the three current OSD windows. obtained from OSD headers in registers 54. The control input of multiplexer 100 is connected to the active OSD window signal on line 82, causing multiplexer 100 to deliver to its output, the number of bits per pixel used in the pixel values of the active OSD window.

Shifter and selector circuit responds to the position signal delivered from multiplexer 90, and the number of bits per pixel signal delivered from multiplexer 100, by shifting the 64-bit word received from multiplexer 58, to the left, by the number of bits identified by the position signal from multiplexer 92, and delivering 2, 4 or 8 lowest order bits of the result to a palette address circuit 94, padded with leading zeros if necessary to produce an 8 bit output. The number of bits delivered from the 64-bit input word, is determined by the number of bits per pixel for the active OSD window. This causes the up to 8 bits identifying a pixel value for the active window at the current display coordinate, to be delivered to palette address circuit 94.

A multiplexer 96 receives, on lines 98, the palette ID for the palette used by each of the three current OSD windows, obtained from OSD headers in registers 54. Multiplexer 96 receives at its control input the active OSD window signal on line 82, causing multiplexer 96 to deliver to its output, the palette ID for the active OSD window identified by circuit 74.

Palette address circuit 94 uses the number of bits per pixel in the active OSD window from multiplexer 100, to combine the 8 bits received from circuit 90, with the palette ID received from multiplexer 96, to generate an 8-bit address to palette FIFO 60, causing 14-bits of luminance and color information for the current pixel in the active OSD window to be delivered on lines 102 and causing a 2-bit blend factor for the current pixel in the active OSD window to be delivered on lines 104. Further details on the palette address circuit 94 are provided below with reference to FIG. 5, and the format of palette FIFO is described below with reference to FIG. 3.

The 2-bit blend factor for the current pixel on lines 104 is delivered to a blend circuit 106. Also, a 7-bit value representing the luminance value produced by palette FIFO 60 is also delivered to blend circuit 106. In addition, a multiplexer 108 receives, on lines 110, global blend factors for each of the three current OSD windows, obtained from OSD headers in registers 54. Multiplexer 108 also receives a zero blend value on line 112. Multiplexer 108 receives at its control input the active OSD window signal on line 82, causing multiplexer 108 to deliver to blend circuit 106, the global blend factor for the active OSD window identified by circuit 74, or if there is no active OSD window, multiplexer 108 delivers a zero blend factor to blend circuit 106.

Blend circuit 106 combines the global blend factor received from multiplexer 108 with the local blend factor received from palette FIFO 60 on lines 104 and the luminance value received from lines 102, to form a blend factor on line 40 to be delivered to blender 44 (FIG. 1B). The composite blending factor is generated by blend circuit 106 as follows. If the 7-bit luminance value received on lines 102, then the blend factor delivered on lines 106 is automatically set to zero. Otherwise, the blend factor is computed as the product of the 7-bit global blend factor received from multiplexer 108 and the 2-bit local blend factor received on lines 104. Each blend factor is interpreted as a number between 0 and 1, therefore, the 2-bit signal on line 104 is interpreted to have an equivalent value of ¼, ½, ¾ or 1 for binary values of 00, 01, 10 and 11, respectively. The 7-bit global blending factor is interpreted to have an equivalent value of 0, 1/64, 2/64, . . . , 63/64, 1 for binary values of 0000000, 0000001, 0000010, . . . , 0111111, 1000000, respectively. 7-bit values larger than 1000000 are undefined and not used. When blending in blender 44, the OSD signal on line 38 is multiplied by the blending factor b produced by blend circuit 106 on line 40, and the output of blender 42 is multiplied by (1−b), and then the products are summed to produce a resultant signal.

The 14-bit luminance and color information output by palette FIFO 60 is delivered to a decimator and multiplexer circuit 114. Circuit 114 also receives the least significant bit of the current display coordinate. Circuit 114 utilizes these input signals to decimate the luminance and color values and reformats these values to an appropriate format and precision for combining with video in blender 42 (FIG. 1B).

A masking rectangle generator 64 utilizes masking rectangle defining information in mask registers 62 to produce pixel values for masking rectangles. A central component of masking rectangle generator 64 is an area detect and prioritize circuit 118. Circuit 118 receives on lines 120, the start and stop row and column for each of eight masking rectangles, obtained from registers 62. Circuit 118 also receives the current display coordinate on lines 33, and receives on lines 122, the priority codes for each masking rectangle, window, obtained from registers 62. Circuit 118 processes this information to produce a signal on line 124 identifying the "active" masking rectangle, if any. he masking rectangle detect and prioritize circuit 118 can be understood as a simplified version of the OSD area detect and prioritize circuit 74, details of which are provided below with reference to FIG. 7.

A multiplexer 126 receives, on lines 128, blend factors for each of the eight masking rectangles, obtained from registers 62. Multiplexer 126 also receives a zero blend value on line 130. Multiplexer 126 receives at its control input the active masking rectangle signal on line 124, causing multiplexer 126 to deliver on lines 36, the blend factor for the active masking rectangle identified by circuit 118, or if there is no active masking rectangle, multiplexer 126 delivers a zero blend factor to lines 36.

A multiplexer 132 receives, on lines 134, luminance and color values for each of the eight masking rectangles, obtained from registers 62. Multiplexer 132 receives at its control input the active masking rectangle signal on line 124, causing multiplexer 132 to deliver on lines 34, the luminance and color values for the active masking rectangle identified by circuit 118.

Figure 3:
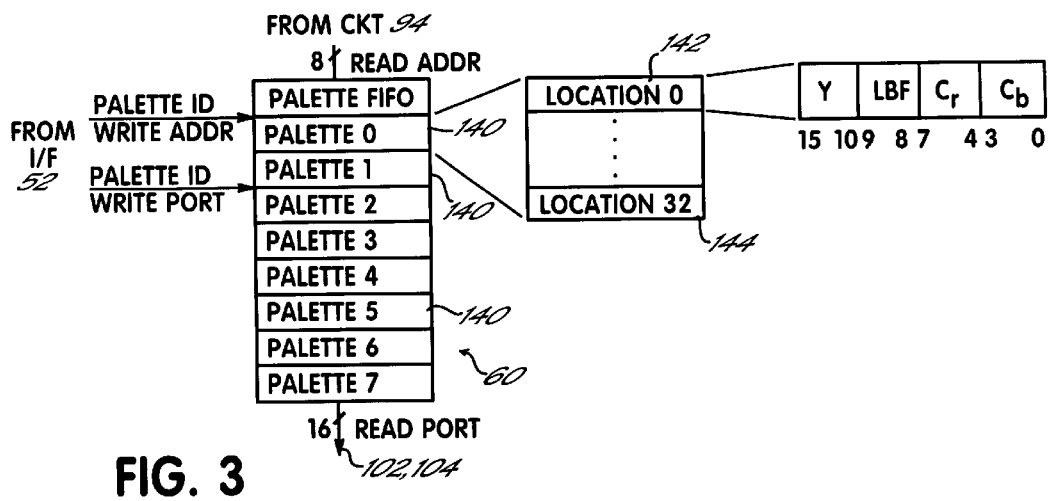
FIG. 3 is an illustration of the palette memory of the display unit of FIG. 2.

Referring now to FIG. 3, the organization of palette FIFO 60 can be explained. Palette FIFO 60 is viewed as including eight 32-entry palettes 140, identified by palette ID's 0 through 7. Each palette 140 includes 32 entries 142, each having the same format as the one entry shown in FIG. 3. The entries have two 4-bit chroma (color values) $C_r$ and $C_b$, a 2-bit local blending factor LBF, and a 6 bit luminance value Y.

As noted above, pixel values can have 2, 4 or 8 bits per pixel. When a particular OSD window uses only 2-bits per pixel, the corresponding palette will have four entries. When an OSD window uses 4-bits per pixel, the corresponding palette will have sixteen entries. In either of these cases, any palette ID may be used to store the palette. When an OSD window uses 8-bits per pixel, the corresponding palette will have 256 entries. A 256 entry palette will consume the entire palette memory. Accordingly, when any one OSD window uses an 8-bits per pixel palette, the palette must be stored under palette ID 0. Furthermore, in such a situation all other OSD windows that are active at the same time must also use the same palette in palette ID 0. The CPU software is responsible for managing the use of palettes and defining the number of bits per pixel for each OSD window to be consistent with these requirements.

Referring now to FIG. 4, details of the information contained in an OSD header can be explained. As noted above, the OSD header is a 192 bit string that for convenience is illustrated in FIG. 4 as three 32-bit words 150, 152 and 154.

The first 64-bit word 150 includes a 3-bit identification of a palette ID for the palette to be used with the OSD window defined by the header, which is used by address circuit 94 to aid in generating a palette address. Word 150 also includes an identification of the row and column start and stop coordinates for the OSD window, which are used by area detect and prioritize circuit 74 to determine whether the current display coordinate is within an OSD window. 10 bits are used for column numbers and 9 bits are used for row numbers, to allow enough bits to identify windows in a standard definition 640×480 display. Word 150 also includes a 22-bit memory address which points to the location of the next OSD header in the memory, if any. As noted above, this pointer permits the OSD headers to be arranged in a linked list to facilitate automatic retrieval of OSD information for subsequent windows. To simplify the process of parsing such a linked list a last bit NN in word 150 is used as a "No Next" bit to indicate that there is no next OSD header in the linked list.

The second 64-bit word 152 includes a single bit ND which when set indicates that there is no pixel data for the OSD window. In some cases, an OSD window may be used, not for displaying data, but simply for loading a palette into palette memory 60. In this case, there is no pixel data for the OSD window. To handle this situation, the ND flag is used to indicate when there is no pixel data for the OSD window. Word 152 also includes a 4-bit bpp field for an identification of the number of bits per pixel to be used with the OSD window, which is used by clock/position circuit 84 and by palette address circuit 94. The number of bits per pixel can have four values: 2 bits per pixel, 4 bits per pixel, 4 bits for two pixels, and 8 bits per pixel. Word 152 also includes a 22-bit memory address identifying the location of the pixel values for the OSD window that are stored in memory. Word 152 also includes a 22-bit memory address for a palette to be used with the OSD window. Word 152 further includes a 2-bit priority value for identifying a priority level from 0 to 3 for the window to determine which of two windows that are active at a current display coordinate, will be displayed. Word 152 also includes a 7-bit global blending factor to be used with the OSD window, which is used by blend circuit 106. Finally, word 152 includes an NP flag, indicating that the OSD window does not have pallette data to be loaded into the pallette FIFO. An OSD window may used an existing pallette rather than loading a new pallette from memory. When this is done, the NP flag is set to indicate that no new pallette needs to be loaded.

The third 64-bit word 154 includes row and column start and stop coordinates, used by circuit 74 to determine whether the current display coordinate is within the "display area" of an OSD window. Word 154 also includes three display flags DF. The display flags are used to specify the relationship between the display area and the OSD window. If the lowest order display flag DF[0] has a value of "0", this indicates that rows of pixels in the OSD window that are inside of the display area should be displayed, whereas if DF[0] has a value of "1", this indicates that rows of pixels in the OSD window that are outside of the display area should be displayed. If the next display flag DF[1] has a value of "0", this indicates that columns of pixels in the OSD window that are inside of the display area should be displayed, whereas if DF[1] has a value of "1", this indicates that columns of pixels in the OSD window that are outside of the display area should be displayed. If the most significant display flag DF[2] is set to a value of "1", this indicates that all pixels in the OSD window should be displayed, and the display area should be ignored. The provision for a display area of the OSD window in this manner provides an additional layer of control and management of on-screen displays that is powerful.

Figure 5:
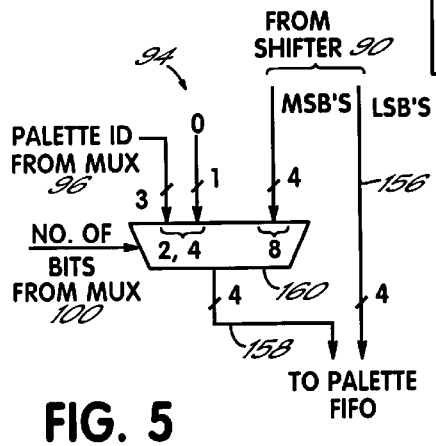
FIG. 5 is an illustration of the palette address circuit of the display unit of FIG. 2.

Referring now to FIG. 5, details of the palette address circuit 94 can be explained. As seen in FIG. 5, a palette address is generated by combining the four least significant bits from the output of shifter and selector circuit 90, on lines 156, with four more significant bits, on lines 158. The four more significant bits on lines 158 are generated by a multiplexer 160. The control input of multiplexer 160 is connected to the signal from multiplexer 100 identifying the number of bits per pixel in the active OSD window. The inputs to multiplexer 160 are (a.) the four most significant bits of the output of shifter and selector circuit 90, which are selected by multiplexer 160 if there are eight bits per pixel in the active OSD window, and (b.) the 3-bit palette ID received from multiplexer 96, appended to a 0 bit in the least significant position, which are selected by the multiplexer 160 if there are two or four bits per pixel in the active OSD window. This implements the automatic selection of palette 0 for OSD windows having eight bits per pixel and the selection of an appropriate palette for OSD windows with two or four bits per pixel.

Figure 6:
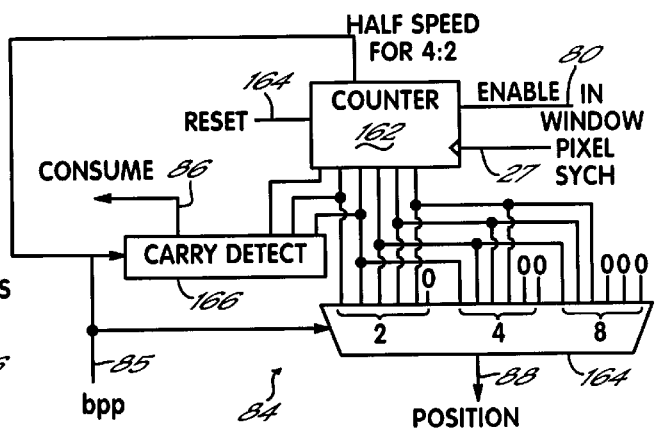
FIG. 6 is an illustration of a one-window clock/position circuit of the clock/position circuit of the display unit of FIG. 2.

Referring now to FIG. 6, details of the clock/position circuit 84 can be explained. FIG. 6 illustrates one of three window clock/position circuits inside of circuit 84, which produces a consume signal for a single OSD window and a position signal 88 for a single OSD window. The heart of this circuit is a 6-bit counter 162. This counter is clocked by the pixel synchronization clock on line 27, to increment with the output of each pixel. The counter is enabled to increment only when the in window signal on line 80 for the corresponding OSD window is asserted. Accordingly, the counter will only count pixels that are within the OSD window. Counter 162 is reset by a signal on line when an OSD window is initially loaded, so that counter 162 begins counting from zero for each new OSD window. Counter 162 is also responsive to the bits per pixel value on line 85 for the OSD window, so that when an OSD window uses a four bits for two pixels mode, counter 182 is incremented with every other pixel synchronization clock.

The position signal on line 88 for an OSD window is derived from the three, four or five least significant bits output from the 6-bit counter 162. A multiplexer 164 has its control input connected to the bits per pixel signal on line 85, and thus selects one of three binary values derived from the least significant bits of counter 162. Specifically, when the number of bits per pixel for a window is 2, the five least significant bits of the output of counter 162, are appended to a zero bit in the least significant position, and delivered as a position signal 88. When the number of bits per pixel for a window is 3, the four least significant bits of the output of counter 162, are appended to two zero bits in the least significant position, and delivered as a position signal 88. When the number of bits per pixel for a window is 8, the three least significant bits of the output of counter 162, are appended to three zero bits in the least significant position, and delivered as a position signal 88.

The consume signal on line 86 is generated by a carry detection circuit 166, which is coupled to the three most-significant bits of the output of the seven bit counter 162. When the number of bits per pixel for a window is 2, carry detection circuit 166 detects a carry into bit 5, the most significant bit of the six-bit counter 162. When the number of bits per pixel for a window is 4, carry detection circuit 166 detects a carry into bit 4, the next most significant bit of the six-bit counter 162. When the number of bits per pixel for a window is 8, carry detection circuit 166 detects a carry into bit 3, the next most significant bit of the six-bit counter 162. When carry detection circuit 166 detects a carry, it produces the consume signal on line 86 to the FIFO storing pixel values for the corresponding OSD window, to cause the FIFO to consume a 64-bit word of pixel values and output a new 64-bit word of values.

Figure 7:
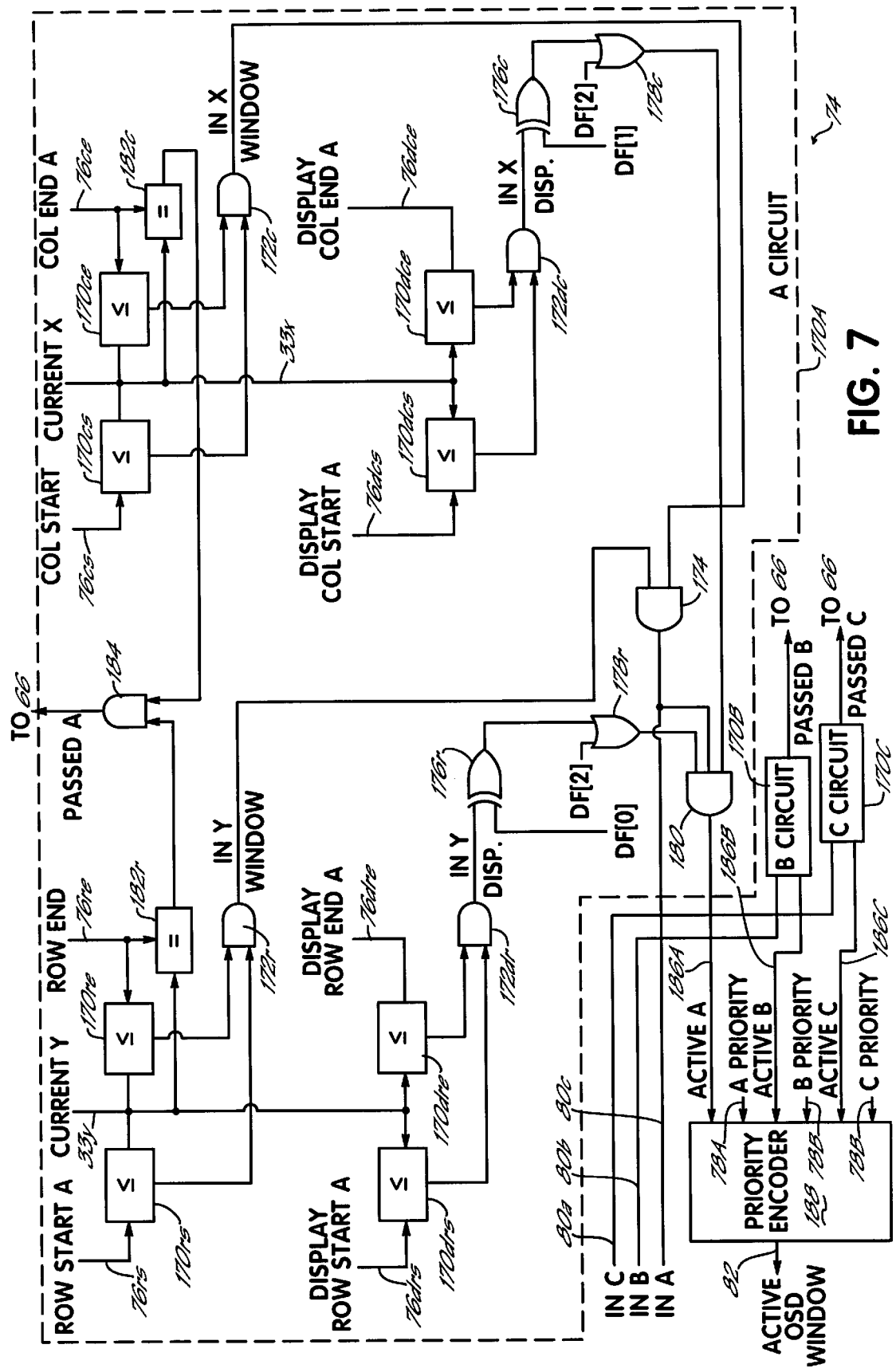
FIG. 7 is an illustration of the area detect and prioritize circuit of the display unit of FIG. 2.

Referring now to FIG. 7, details of the area detect and prioritize circuit 74 can be explained. This circuit comprises three area detection circuits 170A, 170B and 170C, one for each OSD window. The details of one area detection circuit 170A are provided; the other circuits are identical except the input row/column start/end signals 76 and display flag signals DF are those of different OSD windows.

The area detection circuit includes a number of similar comparison circuits for determining whether the current display coordinate is between the start/end (i.e., start/stop) coordinates for the window. Specifically, the current x coordinate 33x is compared to the current column end coordinate 76ce and to the current column start coordinate 76cs by circuits 170ce and 170cs, respectively. The outputs of circuits 170ce and 170cs are delivered to an AND gate 172c which indicates whether the current x coordinate 33x is within the column limits of the OSD window. Similarly, the current y coordinate 33y is compared to the current row end coordinate 76re and to the current row start coordinate 76rs by circuits 170re and 170rs, respectively. The outputs of circuits 170re and 170rs are delivered to an AND gate 172r which indicates whether the current y coordinate 33y is within the row limits of the OSD window. The output of AND gates 172c and 172r are connected to an AND gate 174. The output of AND gate 174 will be a "1" only if the current display coordinate is within the OSD window, otherwise not. Accordingly, the output of AND gate 174 is used as the in window signal on line 80a delivered to clock/position circuit 84.

Similar logic is used on the display area row/column start/end (i.e., start/stop) values. Specifically, the current x coordinate 33x is compared to the current display area column end coordinate 76dce and to the current display area column start coordinate 76dcs by circuits 170dce and 170dcs, respectively. The outputs of circuits 170dce and 170dcs are delivered to an AND gate 172dc which indicates whether the current x coordinate 33x is within the display area column limits of the OSD window. The output of AND gate 172dc is delivered to one input of an XOR gate 176c. The other input to XOR gate 176c is connected to DF[1]. This connection causes columns outside of the display area to be identified by a "1" value at the output of XOR gate 176c, when DF[1] is "1", otherwise not. The output of XOR gate 176c is connected to an OR gate 178c. The other input of OR gate 178c is connected to DF[2]. This connection causes the current display coordinate to be indicated as always in the display area, when DF[2] is "1".

Similarly, the current y coordinate 33y is compared to the current display area row end coordinate 76dre and to the current display area row start coordinate 76*drs* by circuits 170*dre* and 170*drs*, respectively. The outputs of circuits 170*dre* and 170*drs* are delivered to an AND gate 172*dr* which indicates whether the current x coordinate 33*x* is within the display area column limits of the OSD window. The output of AND gate 172*dr* is delivered to one input of an XOR gate 176*r*. The other input to XOR gate 176*r* is connected to DF[0]. This connection causes rows outside of the display area to be identified by a "1" value at the output of XOR gate 176*r*, when DF[0] is "1", otherwise not. The output of XOR gate 176*r* is connected to an OR gate 178*r*. The other input of OR gate 178*r* is connected to DF[2]. This connection causes the current display coordinate to be indicated as always in the display area, when DF[2] is "1".

The output of AND gate 174, which indicates whether the current display coordinate is in the OSD window, and the outputs of OR gates 178*r* and 178*c*, are delivered to a three-input AND gate 180. If all three inputs are "1", this indicates that the current display coordinate is within the OSD window and within the display area of the OSD window. In this instance, the window is considered potentially active, as identified by a "1" signal on a line 186 leading to priority encoder 188.

Priority encoder 188 receives the potentially active signals on lines 188 from each of the three area detector circuits 170A, 170B and 170C. Priority encoder 188 also receives the priority codes for the three OSD windows on lines 78A, 78B and 78C. Priority encoder 188 produces the active OSD window signal on line 82, by selecting the potentially active window with the highest priority code. If no windows are active, then the signal on line 82 indicates that there are no active windows.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A display unit for generating a display of a plurality of overlapping windows, each window having a priority for display and defined by pixels each having a color and luminance value, comprising:

an area detector and prioritizer responsive to a current display coordinate for determining a highest priority window having a pixel value for a current display coordinate; and generating an active window signal identifying said highest priority window, a plurality of buffers, each buffer storing pixel values for one of said plurality of overlapping windows, at least a first and a second window stored in said buffers having a different number of pixel values, each buffer delivering one or more pixel value signals on a buffer output, the output signals from a buffer including a pixel value for the window stored in the buffer, for a current display coordinate, a multiplexer receiving the pixel value signals from said buffers and being responsive to said active window signal for delivering a multiplexer output taken from the output of the buffer storing the window identified by said active window signal.

2. The display unit of claim 1 further comprising a selector circuit receiving said multiplexer output and generating therefrom a selector output signal representing bits in said multiplexer output signal identifying a pixel value at a current display coordinate.

3. The display unit of claim 2 wherein said selector circuit is responsive to a position signal to determine a starting position of bits in said multiplexer output signal identifying a pixel value at a current display coordinate.

4. The display unit of claim 3 further comprising a clock/position circuit receiving an identification of a number of bits used to represent a pixel in each said overlapping windows, and a plurality of in window signals respectively indicating whether a current display coordinate is inside of a respective one of said plurality of overlapping windows, and generating therefrom a plurality of window position signals respectively indicating the starting position of bits identifying a pixel value at a current display coordinate in a respective output signal from a respective buffer, and a multiplexer receiving said window position signals from said clock/position circuit and being responsive to said active window signal for delivering said position signal to said selector circuit by selecting the window position signal for the buffer storing pixels for a window identified by said active window signal.

5. The display unit of claim 4 wherein said clock/position circuit comprises a plurality of window clock/circuits, each comprising a counter, said counter icrementing a value when enabled each time a current display coordinate is changed, said counter being enabled by an in window signal, a multiplexer responsive to an identification of a number of bits used to represent a pixel, for selecting a subset of the bits forming the value in said counter to generate a position signal.

6. The display unit of claim 5 wherein each said window clock/position circuit further comprises a carry detection circuit responsive to an identification of a number of bits use tp a pixel, for generating a consume signal in response to detection of a carry into a selected bit of said value in said counter, wherein each said buffer is responsive to a consume signal to deliver on or more new pixel value signals on said buffer output.

7. The display unit of claim 2 further comprising a pallette memory storing a plurality of pallettes, each pallette comprising a plurality of luminance and/or color values, said pallette memory being responsive to an address input to deliver a luminance and/or color value stored in a pallette at an address identified by said address input, and an address circuit receiving said selector output signal and an identifier of a pallette for an active window and generating therefrom an address of a luminance and/or color value in a pallette in said pallette memory.

8. The display unit of claim 7 further comprising a multiplexer receiving a plurality of respective pallette identifiers respectively identifying a pallette to be used with a respective one of said overlapping windows, said multiplexer being responsive to said active window signal to deliver a pallette identifier to said address circuit by selecting the pallette identifier for the window identified by said active window signal.

9. The display unit of claim 7 wherein said address circuit generates said address by combining lower order bits of said selector output signal with upper order bits, said upper order bits being selected from said identifier of said pallette or higher order bits of said selector output signal, in response to said an of a number of bits used to represent a pixel a window identified by said active window signal.

10. The display unit of claim 7 wherein each said pallette further comprises a blend value, said pallette memory being responsive to an address input to deliver a blend value along with a luminance and/or color value stored in a pallette at an address identified by said address input.

11. The display unit of claim 10 further comprising a blender responsive to a luminance and/or color value delivered by said pallette memory and blending said luminance and/or color value with a background luminance or color at a ratio responsive to a blend value delivered by said pallette memory.

12. The display unit of claim 11 further comprising a blend circuit for combining a global blend value for a window identified by said active window signal with a blend value delivered by said pallette memory to generate a blend value for delivery to said blender.

13. The display unit of claim 11 further comprising a decimator and multiplexer for reformatting luminance and/or color values delivered by said pallette memory into a format for use by said blender.

14. The display unit of claim 4 wherein said area detector and prioritizer also generates a plurality of in window signals respectively indicating whether a current display coordinate is inside of a respective one of said plurality of overlapping windows without regard to priority, and comprises plurality of window area detector circuits each comprising
- a row detector for determining whether a current display coordinate is between a starting and ending row of one of said overlapping windows,
- a column detector for determining whether a current display coordinate is between a starting and ending column of the overlapping window, and
- a first AND circuit for producing an in window signal if both said row and column detectors indicating that a current display coordinate is in the overlapping window.

15. The display unit of claim 14 wherein each said window area detector circuits further comprises
- a display area row detector for determining whether a current display coordinate is within a display area of one of said overlapping windows,
- a display area column detector for determining whether a current display coordinate is between a starting and ending row of the overlapping window, and
- a second AND circuit for producing a possible active window signal if both said display area row and display area column detectors and said first AND circuit indicate that a current display coordinate is within the overlapping window and within a display area of the overlapping window.

16. The display unit of claim 15 wherein said area detector further comprises a priority encoder responsive to possible active window signals from said area detector circuits and to a priority for display for each window, and generating said active window signal by identifying a highest priority window for which a possible active window signal is asserted.

17. The display unit of claim 1 further comprising a masking rectangle generator, said masking rectangle generator generating plurality of overlapping masking rectangles, each rectangle having a priority for display and defined by a fixed color and luminance value, comprising:
- a rectangle area detector and prioritizer responsive to a current display coordinate for determining a highest priority rectangle at a current display coordinate, and generating an active rectangle signal identifying said highest priority rectangle,
- a multiplexer receiving a color and luminance value for each said rectangle, and being responsive to said active rectangle signal for delivering the rectangle color and luminance value for the rectangle identified by said active rectangle signal.

18. The display unit of claim 17 wherein said masking rectangle generator further comprises a multiplexer receiving a blend value for each said rectangle, and being responsive to said active rectangle signal for delivering a rectangle blend value for the rectangle identified by said active rectangle signal.

19. The display unit of claim 18 further comprising a rectangle blender responsive to said rectangle luminance and/or color value and blending said rectangle luminance and/or color value with a background luminance or color at a ratio responsive to said rectangle blend value.

20. The display unit of claim 19 further comprising a window blender responsive to a window luminance and/or color value and window blend value derived from a pixel value signal for the window identified by said active window signal, and blends said window luminance and/or color value with an output of said rectangle blender at a ratio responsive to said window blend value.

21. A display unit for generating a display of a plurality of overlapping windows, each window having a priority for display and defined by pixels each having a color and luminance value, comprising:
- an area detector and prioritizer responsive to a current display coordinate for determining a highest priority window having a pixel value for a current display coordinate, and generating an active window signal identifying said highest priority window,
- a plurality of buffers, each buffer storing pixel values for one of said plurality of overlapping windows, at least a first and a second window having pixel values represented with different numbers of bits, each buffer delivering one or more pixel value signals on a buffer output, the output signals from a buffer including a pixel value for the window stored in the buffer, for a current display coordinate,
- a multiplexer receiving the pixel value signals from said buffers and being responsive to said active window signal for delivering a multiplexer output taken from the output of the buffer storing the window identified by said active window signal.

22. The display unit of claim 21 further comprising a selector circuit receiving said multiplexer output and generating therefrom a selector output signal representing bits in said multiplexer output signal identifying a pixel value at a current display coordinate.

23. The display unit of claim 22 wherein said selector circuit is responsive to a position signal to determine a starting position of bits in said multiplexer output signal identifying a pixel value at a current display coordinate.

24. The display unit of claim 23 further comprising
- a clock/position circuit receiving an identification of a number of bits used to represent a pixel in each said overlapping windows, and a plurality of in window signals respectively indicating whether a current display coordinate is inside of a respective one of said plurality of overlapping windows, and generating therefrom a plurality of window position signals respectively indicating the starting position of bits identifying a pixel value at a current display coordinate in a respective output signal from a respective buffer, and a multiplexer receiving said window position signals from said clock/position circuit and being responsive to said active window signal for delivering said position signal to said selector circuit by selecting the window position signal for the buffer storing pixels for a window identified by said active window signal.

25. The display unit of claim 24 wherein said clock/position circuit comprises a plurality of window clock/position circuits, each comprising a counter, said counter incrementing a value when enabled each time a current display coordinate is changed, said counter being enabled by an in window signal, a multiplexer responsive to an identification of a number of bits used to represent a pixel, for selecting a subset of the bits forming the value in said counter to generate a position signal.

26. The display unit of claim 25 wherein each said window clock/position circuit further comprises a carry detection circuit responsive to an identification of a number of bits used to represent a pixel, for generating a consume signal in response to detection of a carry into a selected bit of said value in said counter, wherein each said buffer is responsive to a consume signal to deliver one or more new pixel value signals on said buffer output.

27. The display unit of claim 22 further comprising a pallette memory storing a plurality of pallettes, each pallette comprising a plurality of luminance and/or color values, said pallette memory being responsive to an address input to deliver a luminance and/or color value stored in a pallette at an address identified by said address input, and an address circuit receiving said selector output signal and an identifier of a pallette for an active window and generating therefrom an address of a luminance and/or color value in a pallette in said pallette memory.

28. The display unit of claim 27 further comprising a multiplexer receiving a plurality of respective pallette identifiers respectively identifying a pallette to be used with a respective one of said overlapping windows, said multiplexer being responsive to said active window signal to deliver a pallette identifier to said address circuit by selecting the pallette identifier for the window identified by said active window signal.

29. The display unit of claim 27 wherein said address circuit generates said address by combining lower order bits of said selector output signal with upper order bits, said upper order bits being selected from said identifier of said pallette or higher order bits of said selector output signal, in response to said an of a number of bits used to represent a pixel a window identified by said active window signal.

30. The display unit of claim 27 wherein each said pallette further comprises a blend value, said pallette memory being responsive to an address input to deliver a blend value along with a luminance and/or color value stored in a pallette at an address identified by said address input.

31. The display unit of claim 30 further comprising a blender responsive to a luminance and/or color value delivered by said pallette memory and blending said luminance and/or color value with a background luminance or color at a ratio responsive to a blend value delivered by said pallette memory.

32. The display unit of claim 31 further comprising a blend circuit for combining a global blend value for a window identified by said active window signal with a blend value delivered by said pallette memory to generate a blend value for delivery to said blender.

33. The display unit of claim 31 further comprising a decimator and multiplexer for reformatting luminance and/or color values delivered by said pallette memory into a format for use by said blender.

34. The display unit of claim 24 wherein said area detector and prioritizer also generates a plurality of in window signals respectively indicating whether a current display coordinate is inside of a respective one of said plurality of overlapping windows without regard to priority, and comprises plurality of window area detector circuits each comprising a row detector for determining whether a current display coordinate is between a starting and ending row of one of said overlapping windows, a column detector for determining whether a current display coordinate is between a starting and ending column of the overlapping window, and a first AND circuit for producing an in window signal if both said row and column detectors indicating that a current display coordinate is in the overlapping window.

35. The display unit of claim 34 wherein each said window area detector circuits further comprises a display area row detector for determining whether a current display coordinate is within a display area of one of said overlapping windows, a display area column detector for determining whether a current display coordinate is between a starting and ending row of the overlapping window, and a second AND circuit for producing a possible active window signal if both said display area row and display area column detectors and said first AND circuit indicate that a current display coordinate is within the overlapping window and within a display area of the overlapping window.

36. The display unit of claim 35 wherein said area detector further comprises a priority encoder responsive to possible active window signals from said area detector circuits and to a priority for display for each window, and generating said active window signal by identifying a highest priority window for which a possible active window signal is asserted.

37. The display unit of claim 21 further comprising a masking rectangle generator, said masking rectangle generator generating plurality of overlapping masking rectangles, each rectangle having a priority for display and defined by a fixed color and luminance value, comprising:

a rectangle area detector and prioritizer responsive to a current display coordinate for determining a highest priority rectangle at a current display coordinate, and generating an active rectangle signal identifying said highest priority rectangle, a multiplexer receiving a color and luminance value for each said rectangle, and being responsive to said active rectangle signal for delivering the rectangle color and luminance value for the rectangle identified by said active rectangle signal.

38. The display unit of claim 37 wherein said masking rectangle generator further comprises a multiplexer receiving a blend value for each said rectangle, and being responsive to said active rectangle signal for delivering a rectangle blend value for the rectangle identified by said active rectangle signal.

39. The display unit of claim 38 further comprising a rectangle blender responsive to said rectangle luminance and/or color value and blending said rectangle luminance and/or color value with a background luminance or color at a ratio responsive to said rectangle blend value.

40. The display unit of claim 39 further comprising a window blender responsive to a window luminance and/or color value and window blend value derived from a pixel value signal for the window identified by said active window signal, and blends said window luminance and/or color value with an output of said rectangle blender at a ratio responsive to said window blend value.

* * * * *

UNITED STATES PATENT AND TRADEMARK OFFICE
CERTIFICATE OF CORRECTION

PATENT NO. : 6,518,985 B2
APPLICATION NO. : 09/283376
DATED : February 11, 2003
INVENTOR(S) : Taner Ozcelik et al.

It is certified that error appears in the above-identified patent and that said Letters Patent is hereby corrected as shown below:

On the title page item (73), delete "Sony Corporation and Sony Electronics,", insert --Sony Corporation and Sony Electronics Inc.,--.

Column 1, line 14, delete "onscreen displays", insert --on-screen displays--.

Column 2
Line 46, delete "and, and based", insert --and, based--.
Line 62, delete "windows.", insert --window.--.

Column 3
Line 1, delete "the a number", insert --the number--.
Line 39, delete "above", insert --above.--.
Line 52, delete "can generates", insert --can generate--.
Line 59, delete "the select", insert --then select--.

Column 4
Line 22, delete "defining an", insert --defining a--.
Line 66, delete "informnation", insert --information--.

Column 6
Line 30, delete "delivered vial", insert --delivered via--.
Line 61, delete "circuit 68 and utilizes", insert --circuit 68 utilizes--.
Line 63, delete "on a lines", insert --on lines--.

Column 8, line 3, delete "windows. obtained", insert --windows, obtained--.

Column 9, line 29, delete "any. he", insert --any. The--.

Column 10, line 56, delete "may used an", insert --may use an--.

Column 19
Line 53, Claim 1, delete "coordinate; and", insert --coordinate, and--.

Column 14
Line 13, Claim 4, delete "overlapping windows,", insert --overlapping window,--.
Line 28, Claim 5, delete "clock/circuits", insert --clock/position circuits--.
Line 30, Claim 5, delete "icrementing", insert --incrementing--.
Line 41, Claim 6, delete "use tp", insert --used to represent--.
Line 45, Claim 6, delete "deliver on", insert --deliver one--.

UNITED STATES PATENT AND TRADEMARK OFFICE
CERTIFICATE OF CORRECTION

PATENT NO. : 6,518,985 B2
APPLICATION NO. : 09/283376
DATED : February 11, 2003
INVENTOR(S) : Taner Ozcelik et al.

It is certified that error appears in the above-identified patent and that said Letters Patent is hereby corrected as shown below:

Column 15
Line 4, Claim 9, delete "said an of a number", insert --said number--.
Line 39, Claim 14, delete "detectors indicating", insert --detectors indicate--.

Column 16, line 64, Claim 24, delete "overlapping windows", insert --overlapping window--.

Column 17, line 55, Claim 29, delete "said an of a number", insert --said number--.

Column 18
Line 24, Claim 34, delete "detectors indicating", insert --detectors indicate--.
Line 27, Claim 35, delete "detector circuits", insert --detector circuit--.

Signed and Sealed this

Fifth Day of June, 2007

JON W. DUDAS
*Director of the United States Patent and Trademark Office*